UNITED STATES PATENT OFFICE.

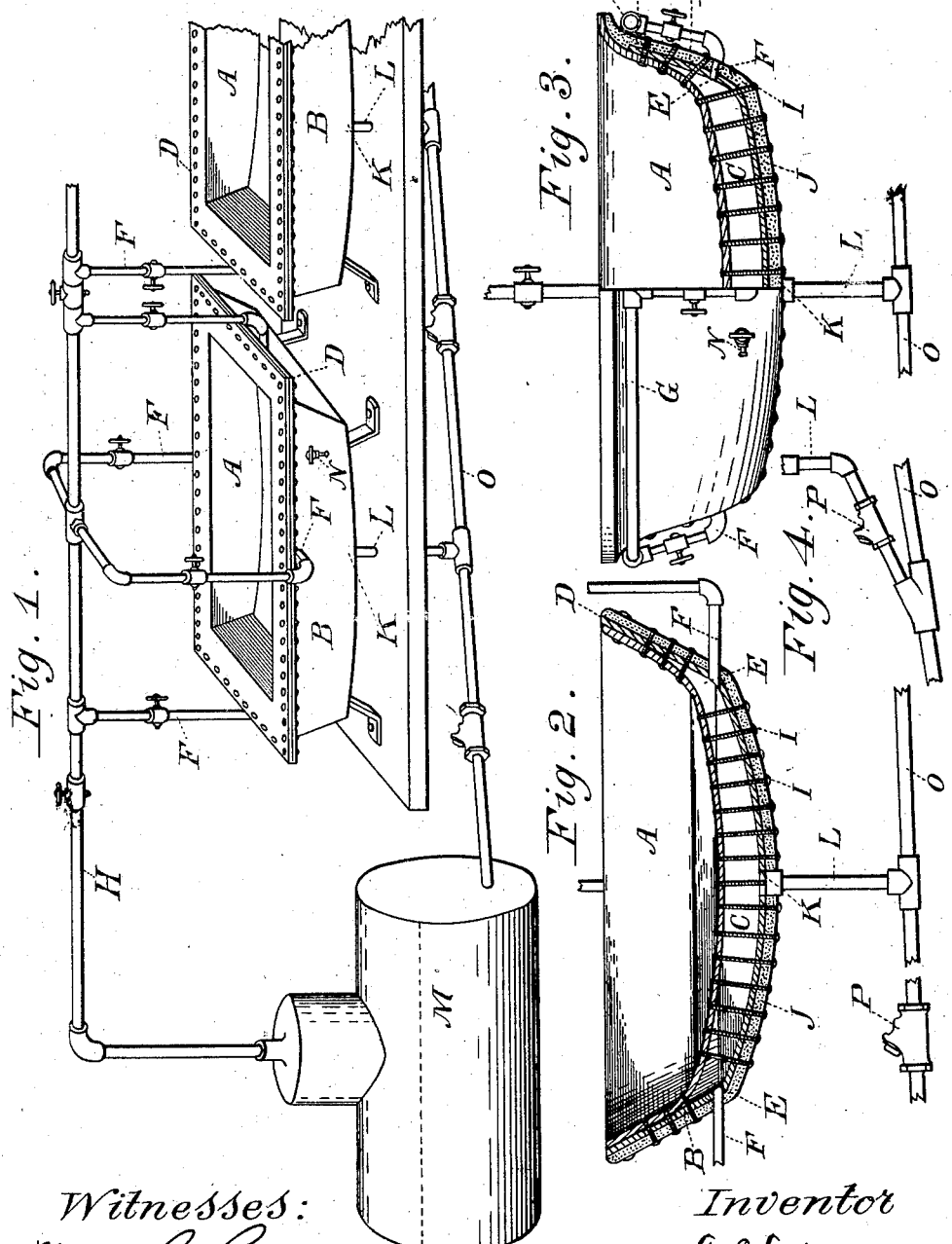

FRANKLIN P. TABER, OF AUBURN, NEW YORK, ASSIGNOR OF TWO-THIRDS TO JOSEPH A. COOK AND CALVIN W. CONKLIN, OF SAME PLACE.

EVAPORATING-PAN.

SPECIFICATION forming part of Letters Patent No. 277,855, dated May 15, 1883.

Application filed February 19, 1883. (No model.)

*To all whom it may concern:*

Be it known that I, FRANKLIN P. TABER, a citizen of the United States, residing at Auburn, in the county of Cayuga and State of New York, have invented new and useful Evaporating-Pans, of which the following, taken in connection with the accompanying drawings, is a full, clear, and exact description.

My invention relates to improvements in evaporating-pans made of metal, in which steam is used as the agent through which heat is applied to the outer surface of the evaporating-pan, and the peculiar means of bringing and retaining the steam in contact with the outer surface of such evaporating-vessel, whereby an intense uniform heat is distributed throughout the entire surface of the pan and the solution subjected to a greater proportionate amount of heating-surface uniformly heated than in any pan now in use, the cost of evaporation greatly reduced by the use of a shallow pan having a large evaporating-surface, and the fuel, labor, and skill demanded to operate the same.

In the accompanying drawings, Figure 1 represents a series of pans connected in my "apparatus for the manufacture of sugar, salt, &c.," patented November 28, 1882, by Letters Patent issued by the United States, and numbered 268,056. Figs. 2 and 3 each represent a sectional view of one of said pans in readiness to be connected in or with said apparatus as a part thereof. Fig. 4 represents a section of the main return-pipe O of said apparatus with its lateral L, showing the valve P, failing to appear in Fig. 1 by reason of the floor there shown.

Similar letters of reference indicate corresponding parts in the different figures in so far as the lettering of one is applicable to the other.

A A A represent the evaporating-pans, each of which is supplied with an outer jacket, B B B, so constructed as to preserve between the pan A A A and the jacket B B B the steam-chamber C C C, and that at the edge D D D of the jacket B B B a steam-fitting joint is made at its point of contact with the pan A A A and the two securely riveted and welded together. The steam-chamber C C is supplied with steam through inlets or holes E E E, made through the jacket B B at a sufficient distance above the bottom of such jacket to prevent dry steam introduced to the steam-chamber coming in contact with water of condensation in the bottom of the jacket B B, each of which said inlets or holes, (of which it is found advisable to have one or more on each side of the pan, and by means thereof equalize the supply and pressure of steam throughout the pan) is connected by pipes F F F, connected with the pipe G, which encircles the pan and is adapted to be connected, in the apparatus above mentioned, with the main supply-pipe H, extending from the boiler M. The pan A A A and the jacket B B B are securely and firmly stay-bolted together by means of stay-bolts I I I I, Figs. 2 and 3, extending at proper distances from each other throughout the entire steam-space between the pan and jacket, and so inserted that the ends of the bolts extending through the pan A A A may be hammered smooth with the inner surface of the pan A A A, and the other end thereof extended through and beyond the outer surface of the jacket B B B, leaving the threads cut thereon exposed, thereby adapting the outer surface of the pan and jacket to receive and hold a non-conducting substance, J J J, after applying which washers and nuts are placed upon the ends of the stay-bolts to secure and hold more firmly the non-conductor. The jackets B B B are each formed with the inner surface inclining toward a point, as K K K, at which an opening is made through B B B to permit the escape of water of condensation from the steam-space C C, the opening being supplied with proper connections to admit of its being connected at that point with the return-pipes L of my apparatus for the manufacture of sugar, salt, &c., above referred to. The steam-chamber C C is supplied with an air-valve, N N, by means of which air in said chamber at the time when steam is first admitted is allowed to escape.

Having now described my invention, what I claim is—

1. In an evaporating-pan, the combination, with the steam-chamber surrounding the pan, of the main pipe provided with laterals penetrating said steam-chamber at different points upon its sides and ends for distributing a uniform heat throughout the entire surface of the pan, as set forth.

2. In an evaporating-pan, the combination, with the steam-chamber surrounding the pan, the main pipe having laterals penetrating said chamber at different points upon its sides and ends, said laterals being provided with separate valves or cocks for regulating the supply and pressure of steam throughout the entire surface of the pan, as set forth.

3. In an evaporating-pan, the combination, with the steam-jacketed pan, of the stay-bolts, nuts, and washers for holding the jacket and pan together, and also to hold the non-conducting material upon the outer face of the jacket, substantially as described.

In witness whereof I have hereunto set my hand, at Auburn, aforesaid, this 8th day of February, 1883, in presence of two subscribing witnesses.

FRANKLIN P. TABER.

Witnesses:
P. McLAUGHLIN,
R. L. DRUMMOND.